(12) United States Patent
Kulack et al.

(10) Patent No.: US 9,002,905 B2
(45) Date of Patent: *Apr. 7, 2015

(54) RAPIDLY DEPLOYING VIRTUAL DATABASE APPLICATIONS USING DATA MODEL ANALYSIS

(71) Applicant: International Business Machines Corporation, Armonk, NY (US)

(72) Inventors: Frederick A. Kulack, Rochester, MN (US); John E. Petri, St. Charles, MN (US)

(73) Assignee: International Business Machines Corporation, Armonk, NY (US)

( * ) Notice: Subject to any disclaimer, the term of this patent is extended or adjusted under 35 U.S.C. 154(b) by 118 days.

This patent is subject to a terminal disclaimer.

(21) Appl. No.: 13/683,083

(22) Filed: Nov. 21, 2012

(65) Prior Publication Data

US 2013/0080484 A1 Mar. 28, 2013

Related U.S. Application Data

(63) Continuation of application No. 13/153,699, filed on Jun. 6, 2011, now Pat. No. 8,762,428.

(51) Int. Cl.
G06F 17/30 (2006.01)
G06F 17/00 (2006.01)

(52) U.S. Cl.
CPC .... G06F 17/30404 (2013.01); G06F 17/30292 (2013.01)

(58) Field of Classification Search
CPC ....... G06Q 30/02; G06Q 30/06; G06Q 40/08; G06Q 10/02; G06Q 10/08; G06Q 30/0255; G06Q 30/0633; G06Q 50/184; G06Q 10/025; G06Q 10/04; G06Q 10/06315; G06Q 10/06393; G06Q 10/10; G06Q 10/20; G06Q 20/3674; G06Q 20/383; G06Q 30/0202; G06Q 30/0241
USPC .................................................. 707/803–808
IPC ...................... G06F 17/30, 17/00; G06Q 10/00
See application file for complete search history.

(56) References Cited

U.S. PATENT DOCUMENTS

| | | |
|---|---|---|
| 6,490,590 B1 | 12/2002 | Fink |
| 6,826,568 B2 | 11/2004 | Bernstein et al. |
| 8,706,767 B2 * | 4/2014 | Duevel et al. ................. 707/794 |
| 8,762,428 B2 | 6/2014 | Kulack et al. |
| 2012/0310996 A1 | 12/2012 | Kulack et al. |

* cited by examiner

OTHER PUBLICATIONS

U.S. Appl. No. 13/153,699, entitled Rapidly Deploying Virtual Database Applications Using Data Model Analysis, filed Jun. 6, 2011.

*Primary Examiner* — Yicun Wu
(74) *Attorney, Agent, or Firm* — Patterson & Sheridan, LLP

(57) ABSTRACT

Techniques are described for creating a first data abstraction model for a first database. Embodiments analyze the first database to determine a first set of structural characteristics, and analyze a second database to determine a second set of structural characteristics. The analyzed second database is associated with a second data abstraction model. The first set of structural characteristics is compared with the second set of structural characteristics to identify one or more similarities between the two sets of structural characteristics. Embodiments then create the first data abstraction model for the first database, based on the identified similarities and the second data abstraction model.

8 Claims, 9 Drawing Sheets

RAPIDLY DEPLOYING VIRTUAL DATABASE APPLICATIONS USING DATA MODEL ANALYSIS

CROSS-REFERENCE TO RELATED APPLICATIONS

This application is a continuation of co-pending U.S. patent application Ser. No. 13/153,699, filed Jun. 6, 2011. The aforementioned related patent application is herein incorporated by reference in its entirety.

BACKGROUND

The present invention generally relates to data processing and, more particularly, to normalizing data as part of a database restore.

Databases are computerized information storage and retrieval systems. A relational database management system is a computer database management system (DBMS) that uses relational techniques for storing and retrieving data. An object-oriented programming database is a database that is congruent with the data defined in object classes and subclasses. Regardless of the particular architecture, a requesting entity (e.g., an application or the operating system) in a DBMS requests access to a specified database by issuing a database access request. Such requests may include, for instance, simple catalog lookup requests or transactions and combinations of transactions that operate to read, change and add specified records in the database. These requests (i.e., queries) are often made using high-level query languages such as the Structured Query Language (SQL). Upon receiving such a request, the DBMS may execute the request against a corresponding database, and return any result of the execution to the requesting entity.

Data abstraction techniques may be used in conjunction with a database in order to improve the usability of the database. Generally, such techniques provide for an abstraction layer between the database and the users of the database, which enables queries to be issued against the database without referring to the physical structure of the underlying database. This may, in turn, enable queries to be issued against a database using more user-friendly terms. However, creating such an abstraction model for a database is often a very time consuming and costly task, which may deter potential businesses from adopting such data abstraction techniques.

SUMMARY

A method, computer program product and system for creating a first data abstraction model for a first database. The method, computer program product and system include analyzing the first database to determine a first set of structural characteristics of the first database. The method, computer program product and system also include analyzing a second database to determine a second set of structural characteristics of the second database, wherein the second database is associated with a second data abstraction model. The method, computer program product and system further include comparing the first set of structural characteristics with the second set of structural characteristics to identify one or more similarities there between. Additionally, the method, computer program product and system include creating the first data abstraction model for the first database, based on the identified similarities and the second data abstraction model.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1A:
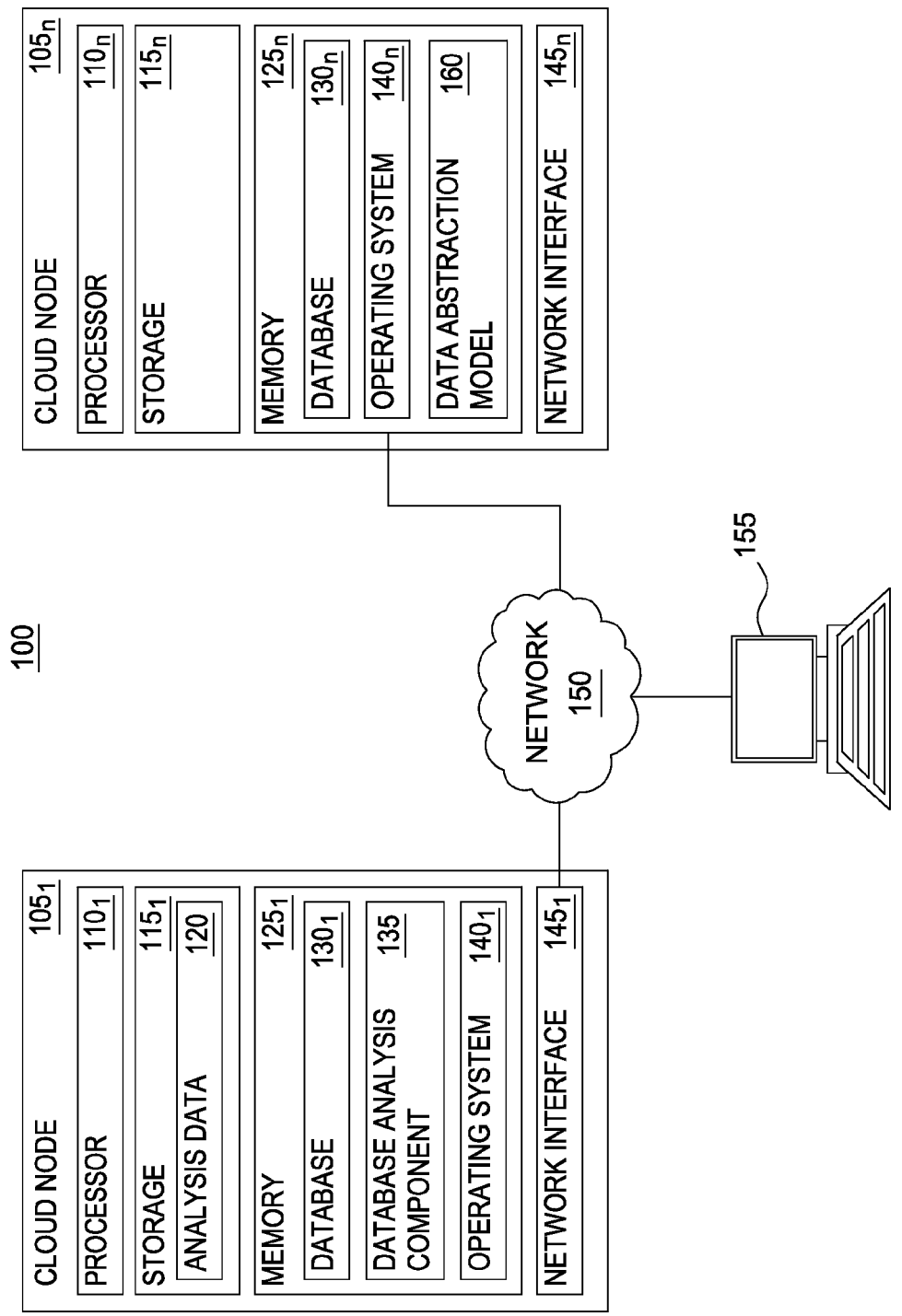
FIGS. 1A-1B are block diagrams illustrating computer systems utilized according to embodiments of the present invention.

Data abstraction models serve to improve the usability of databases by, for instance, allowing users to enter queries using more user-friendly terminology. As an example, an underlying database may store a hospital patient's first name in table "contact" and column "f_name". However, it may be difficult for technologically unsophisticated users to construct queries against the database using the combination of this table and column. In contrast, a data abstraction model may be created with a logical field having a more user-friendly name (e.g., "FirstName"). Users may then specify the name of this logical field in abstract queries. Doing this enables less sophisticated users to more easily construct queries for the database. However, developing such a data abstraction model for the database is often costly in terms of time and resources.

Often times, there are similarities between the structure of multiple databases, even though the databases may be managed by separate entities and contain different data. For example, two hospitals may each maintain separate databases for storing their respective test result data. Although in this example the hospitals are separate and distinct from one another, and even though these databases may contain entirely different data, their databases may store the test result data using the same or a similar structure. For instance, both hospitals may adhere to the same industry standard data model for storing test results (e.g., ICD-9, DRG, etc.). In other words, both hospitals may use a table(s) or subset of a table in order to store the test data, but may do so using multiple, distinct database schemas. For instance, two databases may contain test result data using codes which conform to the Logical Observation Identifiers Names and Codes ("LOINC") standard, but each may store this data using a different database schema. Accordingly, a data abstraction model created for one of the databases may be the same as or similar to a data abstraction model for the other database.

Embodiments of the present invention generally provide techniques for creating a data abstraction model for a first database. Embodiments may analyze the first database to determine a first set of structural characteristics for the database. For example, such characteristics may include what tables the database contains, the structure of the tables, data contained in the tables, and so on. Embodiments may additionally analyze a second database, for which a data abstraction model has already been created, to determine a second set of structural characteristics for the second database. The first set of structural characteristics may then be compared with the second set of structural characteristics to identify similarities between the two databases. Embodiments may then create a data abstraction for the first database, based on the identified similarities and the second data abstraction model for the second database. Advantageously, doing so minimizes the amount of time required to create a data abstraction model for the first database by leveraging existing data abstraction models created for similar databases.

Moreover, it is explicitly contemplated that embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present invention, a user may access applications (e.g., a DBMS) or related data available in the cloud. For example, the DBMS (configured with a database analysis component) could execute on a computing system in the cloud and process queries to access the first database received from users and applications in the cloud. In such a case, the database analysis component could determine a first set of structural characteristics for the first database. Furthermore, the database analysis component may analyze other databases and their corresponding data abstraction models in the cloud to identify similarities with the first database. In one embodiment, such analysis of other databases in the cloud may be performed anonymously, so that any confidential data stored in those databases is not included in the analysis. The database analysis component may then create a data abstraction model for the first database, based on the first set of structural characteristics and the structural characteristics and data abstraction models of the other databases in the cloud. Doing so allows a user to efficiently create a data abstraction model for the first database from any computing system attached to a network connected to the cloud (e.g., the Internet).

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1A, FIG. 1A is a block diagram illustrating a cloud computing environment configured to run a database analysis component, according to one embodiment of the present invention. As shown, the cloud computing environment 100 contains cloud nodes 105 and a management system 155. Generally, the management system 155 is configured to direct the operations of the cloud nodes 105. For instance, the management system 155 may control which cloud node 105 new workloads are instantiated on. The cloud nodes 105 may generally be any devices which contribute resources (e.g., processing, memory, storage, etc.) to the cloud computing environment 100. Additionally, although cloud nodes $105_1$ and $105_N$ are shown, such a depiction is without limitation and for illustrative purposes only. Moreover, one of ordinary skill in the art will quickly recognize that other cloud computing environments may contain any number of nodes.

As shown, cloud node $105_1$ includes, without limitation, a processor $110_1$, system storage $115_1$, a memory $125_1$, and a network interface card $145_1$. The processor $110_1$ generally retrieves and executes programming instructions stored in the memory $125_1$. Similarly, the processor $110_1$ stores and retrieves application data residing in the memory $125_1$. An interconnect (not shown) may be used to transmit programming instructions and application data between the processor $110_1$, storage $115_1$, network interface $145_1$, and memory $125_1$. Processor $110_1$ is included to be representative of a single CPU, multiple CPUs, a single CPU having multiple processing cores, a GPU and the like. More generally, processor 122 may be any processor capable of performing the functions described herein. Although memory $125_1$ is shown as a single entity, memory $125_1$ may include one or more memory devices having blocks of memory associated with physical addresses, such as random access memory (RAM), read only memory (ROM), flash memory or other types of volatile and/or non-volatile memory. Storage $115_1$, such as a hard disk drive, solid state device (SSD), or flash memory storage drive, may store non-volatile data. As shown, storage $115_1$ contains analysis data 120. Generally, the analysis data 120 represents any data relating to database structure analysis. For instance, the analysis data 120 may contain data relating to the structure of a physical database or a data abstraction model, as well as standards information (e.g., particular codes defined according to an industry standard). The cloud node $105_1$ may connect to a network 150 (e.g., the Internet) using the network interface 145. Furthermore, as will be understood by one of ordinary skill in the art, any computer system capable of performing the functions described herein may be used.

In the pictured embodiment, memory $125_1$ contains a database $130_1$, a database analysis component 135 and an operating system $140_1$. The database $130_1$ may be managed by a database management system (not shown). Likewise, the database analysis component 135 is integrated into the database management system (hereinafter "DBMS"). Generally, the operating system $140_1$ may be any operating system capable of performing the functions described herein. Furthermore, although various elements are shown as residing in memory $125_1$ on the cloud node $105_1$, such a depiction is without limitation. Of course, one of ordinary skill in the art will recognize that elements such as, for instance, the database $130_1$, may reside in memory $125_1$ (as shown), in storage $115_1$, a combination thereof, or even on another computer system entirely, and that the depiction shown in FIG. 1A is for illustrative purposes only.

Generally, the database analysis component 135 may analyze the database $130_1$ to determine a first set of structural characteristics for the database $130_1$. These characteristics may include information related to the structure of the database, such as the tables contained in the database and the structure of those tables. The characteristics may further include information on the data contained in the tables. For instance, the database analysis component 135 may analyze the database $130_1$ and determine that one column of data conforms to a particular industry standard. The database analysis component 135 may also examine relationships between the tables in the database. One example of such a relationship would be if a first table of the database $130_1$ contains references to a second table of the database $130_1$ (e.g., a foreign key).

The database analysis component 135 may further analyze the database $130_N$ residing on cloud node $105_N$ to identify a second set of structural characteristics. Similar to the analysis for the database $130_1$, this analysis may examine the structure of tables within the database, as well as data contained in the tables. The database analysis component 135 may then compare the first set of structural characteristics with the second set of structural characteristics to identify similarities between the database $130_1$ and the database $130_N$.

In accordance with embodiments of the present invention, a data abstraction model 160 may be provided for the database $130_N$. Embodiments that use a data abstraction model allow for database queries to be written in the form of abstract queries composed using one or more logical fields. Returning to the present example, the database analysis component 135 may create a data abstraction model for the database $130_1$, based on the identified similarities between the database $130_1$ and the database $130_N$, and the data abstraction model 160 provided for the database $130_N$. For instance, the database analysis component 135 may determine that a first table and a second table from the database $130_1$ and the database $130_N$, respectively, are related, since the tables are structured in the exact same way (although the tables may contain different data). Upon determining these two tables are related, the database analysis component 135 may create portions of the data abstraction model 160 for the database $130_1$, based on portions of the data abstraction model 160 corresponding to the related tables.

As an example, assume that the first table and the second table both contain contact information for hospital patients, that the first table in database $130_1$ contains a column named "fname" storing the first name of each patient, and that the second table in database $130_N$ contains a column named "f_name" for storing the first name of each patient. Furthermore, assume that the data abstraction model 160 contains a logical field named "FirstName" which maps to the "f_name" column in the table of database $130_N$. Upon determining that the first table and the second table are related, the database analysis component 135 may further analyze the data abstraction model 160 and, based on the determination that the logical field "FirstName" maps to the column of "f_name", the database analysis component 135 could create a logical field named "FirstName" in the data abstraction model for the database $130_1$ which maps to the column named "fname". Advantageously, doing so enables the data abstraction model for the database $130_1$ to be quickly and efficiently created, thus saving on the costs in terms of time and resources used to create the data abstraction model.

An Exemplary Query Execution Runtime Environment

Figure 1B:
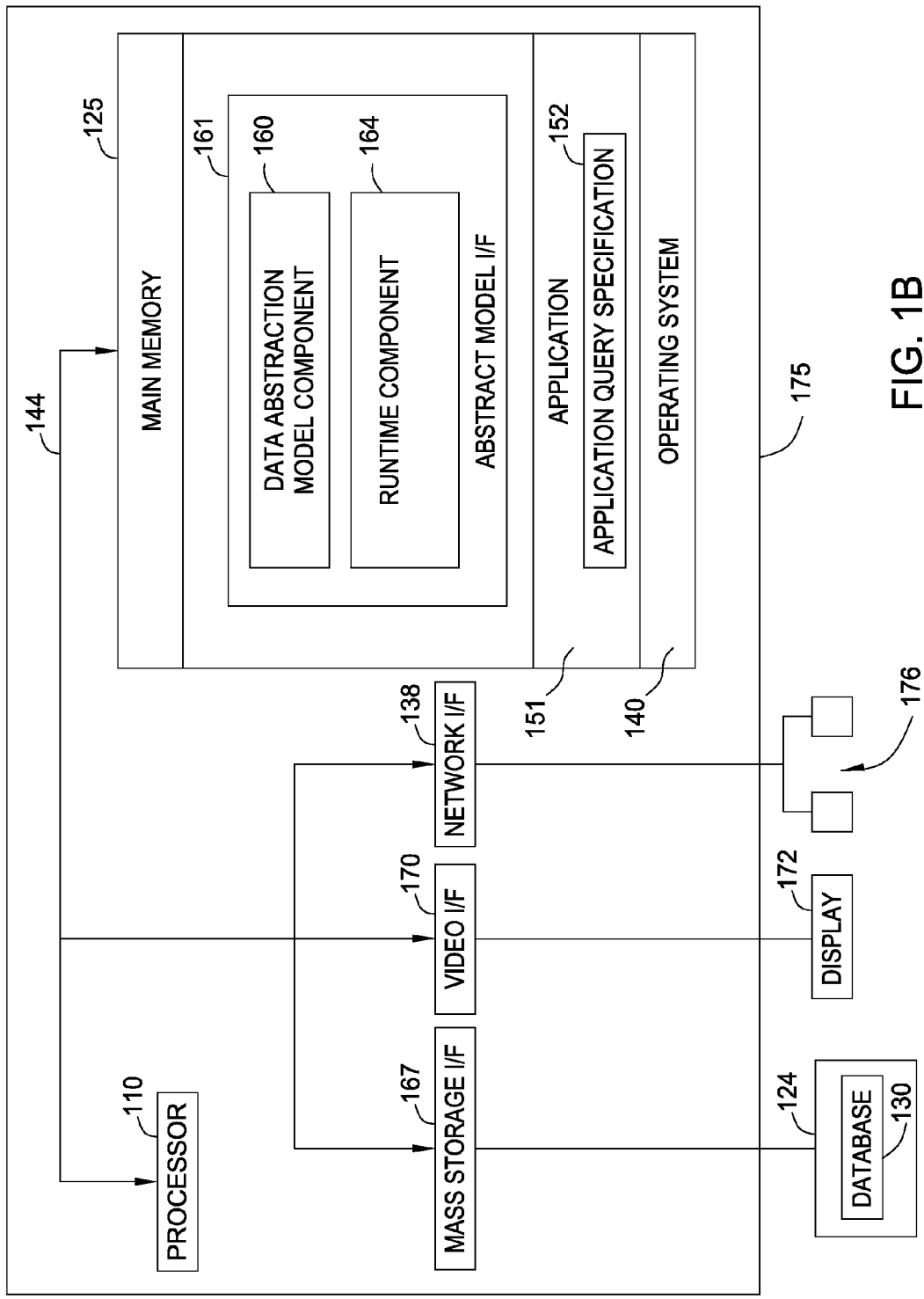

Referring now to FIG. 1B, a computing environment 100 is shown. In general, the environment includes computer system 175 and a plurality of networked devices 176. The computer system 175 may represent any type of computer, computer system or other programmable electronic device, including a client computer, a server computer, a portable computer, an embedded controller, a PC-based server, a minicomputer, a midrange computer, a mainframe computer, and other computers adapted to support the methods, apparatus, and article of manufacture of the invention. Furthermore, as discussed above, in one embodiment, the computer system 175 refers to a cloud node in a cloud computing environment. In one embodiment, the computer system 175 is an eServer computer available from International Business Machines of Armonk, N.Y.

Illustratively, the computer system 175 comprises a networked system. However, the computer system 175 may also comprise a standalone device. In any case, it is understood that FIG. 1B is merely one configuration for a computer system. Embodiments of the invention can apply to any comparable configuration, regardless of whether the computer system 175 is a complicated multi-user apparatus, a single-user workstation, or a network appliance that does not have non-volatile storage of its own.

The embodiments of the present invention may also be practiced in distributed computing environments in which tasks are performed by remote processing devices that are linked through a communications network. In a distributed computing environment, program modules may be located in both local and remote memory storage devices. In this regard, the computer system 175 and/or one or more of the networked devices 176 may be thin clients which perform little or no processing.

As shown, the computer system 175 includes a number of operators and peripheral systems. For instance, the system 175 includes a mass storage interface 167 operably connected to a direct access storage device 124, a video interface 170 operably connected to a display 172, and a network interface 138 operably connected to the plurality of networked devices 176. The display 172 may be any video output device for outputting viewable information.

Computer system 175 is shown comprising at least one processor 110, which obtains instructions and data via a bus 144 from a main memory 125. The processor 110 could be any processor adapted to support the methods of the invention. The main memory 125 is any memory sufficiently large to hold the necessary programs and data structures. Main memory 125 could be one or a combination of memory devices, including Random Access Memory, nonvolatile or backup memory, (e.g., programmable or Flash memories, read-only memories, etc.). In addition, memory 125 may be considered to include memory physically located elsewhere in the computer system 175, for example, any storage capacity used as virtual memory or stored on a mass storage device (e.g., direct access storage device 124) or on another computer coupled to the computer system 175 via bus 144.

The memory 125 is shown configured with an operating system 140. The operating system 140 is the software used for managing the operation of the computer system 175. Examples of the operating system 140 include IBM OS/400®, UNIX, Microsoft Windows®, and the like.

The memory 125 further includes one or more applications 151 and an abstract model interface 161. The applications 151 and the abstract model interface 161 are software products comprising a plurality of instructions that are resident at various times in various memory and storage devices in the computer system 175. When read and executed by one or more processors 110 in the computer system 175, the applications 151 and the abstract model interface 161 cause the computer system 175 to perform the steps necessary to execute steps or elements embodying the various aspects of the invention. The applications 151 (and more generally, any requesting entity, including the operating system 140) are configured to issue queries against a database 130 (shown in storage 124). The database 130 is representative of any collection of data regardless of the particular physical representation of the data. A physical representation of data defines an organizational schema of the data. By way of illustration, the database 130 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

The queries issued by the applications 151 are defined according to an application query specification 152 included with each application 151. The queries issued by the applications 151 may be predefined (i.e., hard coded as part of the applications 151) or may be generated in response to input (e.g., user input). In either case, the queries (referred to herein as "abstract queries") are composed using logical fields defined by the abstract model interface 161. A logical field defines an abstract view of data whether as an individual data item or a data structure in the form of, for example, a database table. In particular, the logical fields used in the abstract queries are defined by a data abstraction model component 160 of the abstract model interface 161. The runtime component 164 transforms the abstract queries into concrete queries having a form consistent with the physical representation of the data contained in the database 130. The concrete queries can be executed by the runtime component 164 against the database 130.

Figure 2:
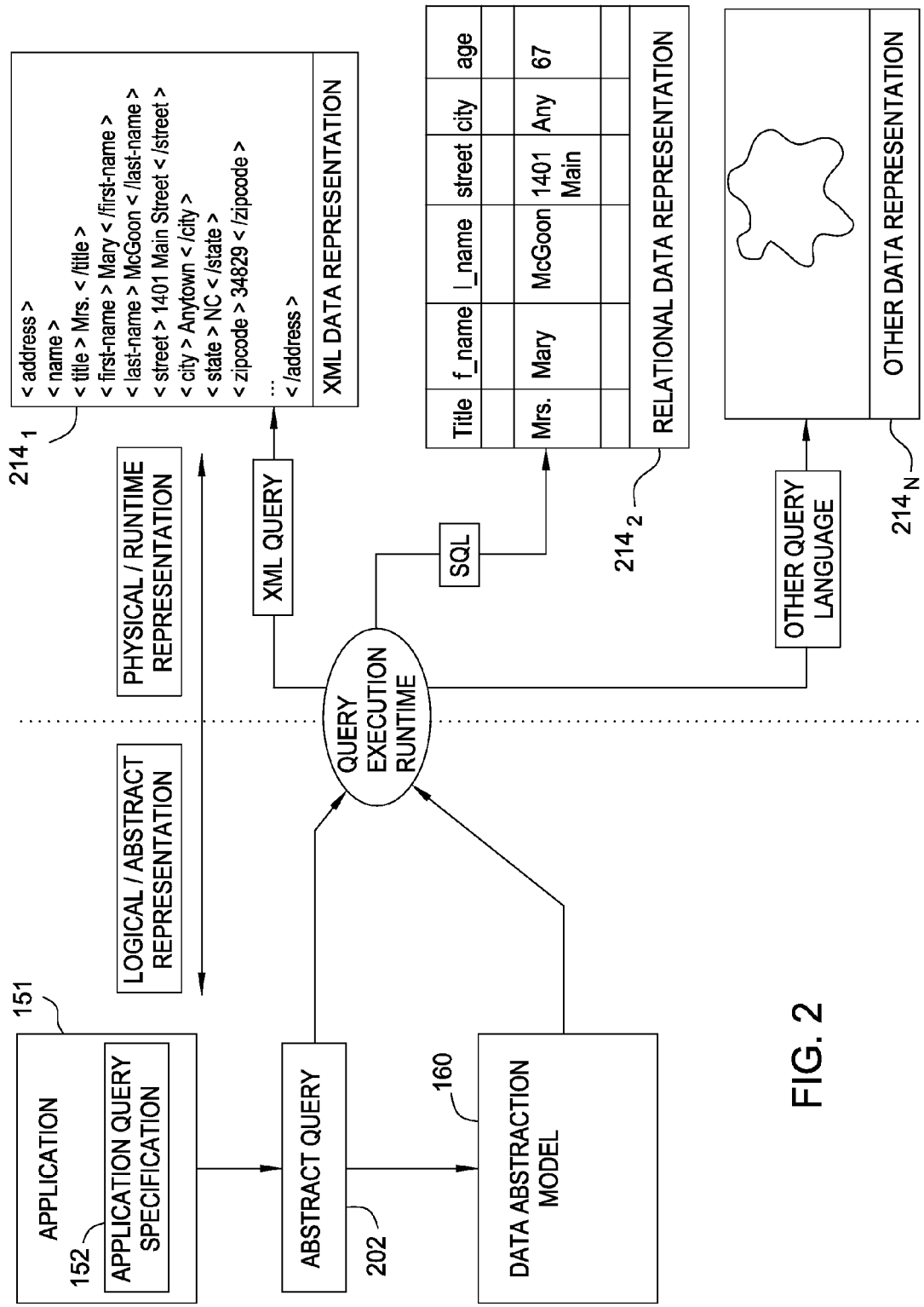
FIGS. 2-3 are relational views of software components for abstract query management, according to embodiments of the present invention.

Referring now to FIG. 2, a relational view illustrating interaction of the runtime component 164, the application 150, and the data abstraction model 160 at query execution runtime is shown. The data abstraction model 160 is also referred to herein as a "logical representation" because the data abstraction model 160 defines logical fields corresponding to data structures in a database (e.g., database 130), thereby providing an abstract (i.e., a logical) view of the data in the database. A data structure is a physical arrangement of the data, such as an arrangement in the form of a database table or a column of the database table. In a relational database environment having a multiplicity of database tables, a specific logical representation having specific logical fields can be provided for each database table. In this case, all specific logical representations together constitute the data abstraction model 160. Physical entities of the data are arranged in the database 130 according to a physical representation of the data. A physical entity of data (interchangeably referred to as a physical data entity) is a data item in an underlying physical representation. Accordingly, a physical data entity is the data included in a database table or in a column of the database table, i.e., the data itself. By way of illustration, two physical representations are shown, an XML data representation $214_1$ and a relational data representation $214_2$. However, the physical representation $214_N$ indicates that any other physical representation, known or unknown, is contemplated. In one embodiment, a different single data abstraction model 160 is provided for each separate physical representation 214, as explained above for the case of a relational database environment. In an alternative embodiment, a single data abstraction model 160 contains field specifications (with associated access methods) for two or more physical representations 214. A field specification is a description of a logical field and generally comprises a mapping rule that maps the logical field to a data structure(s) of a particular physical representation.

Figure 3:
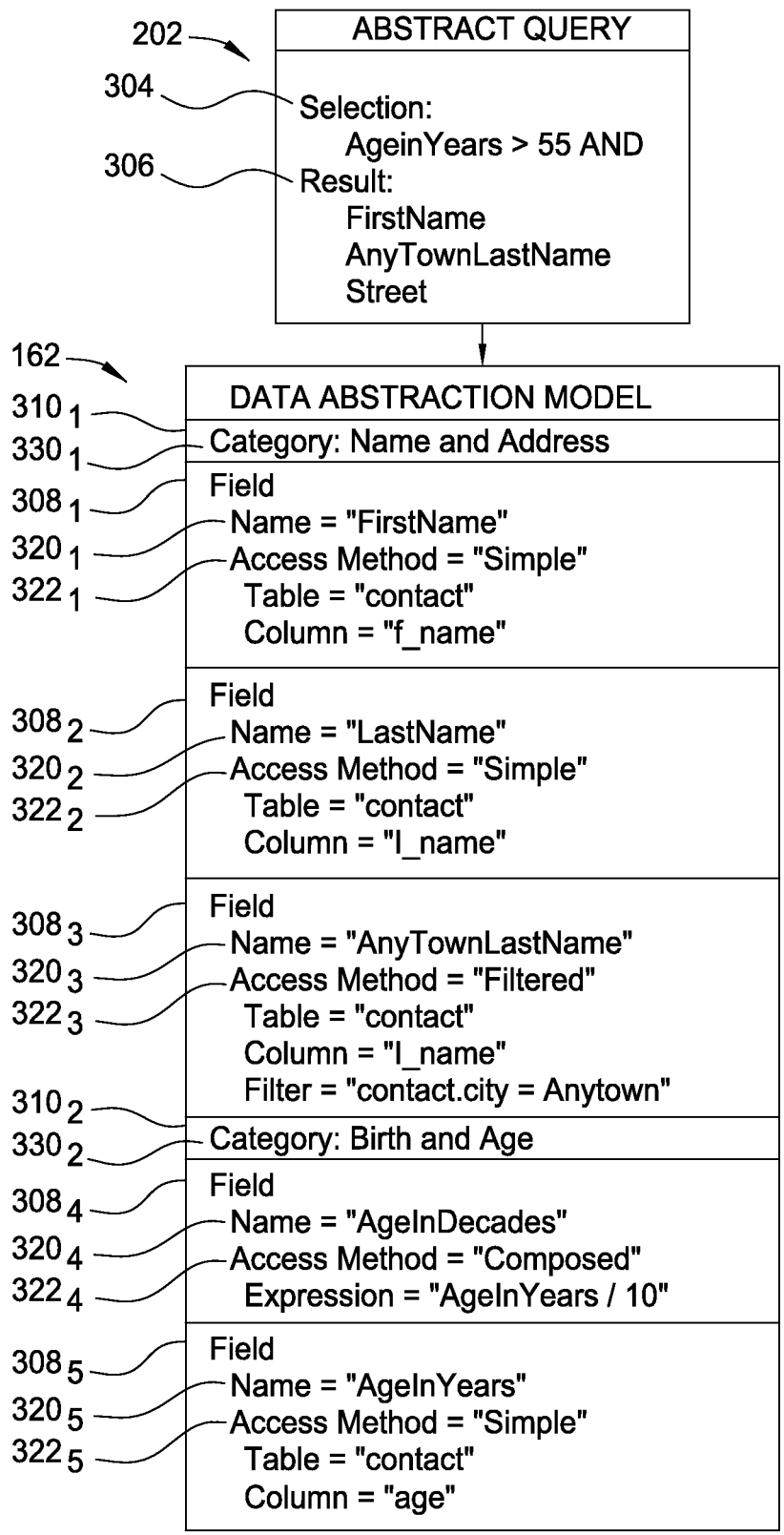

Using a logical representation of the data, the application query specification 152 specifies one or more logical fields to compose a resulting query. A requesting entity (e.g., the application 151) issues the resulting query 202 as defined by an application query specification of the requesting entity. In one embodiment, the abstract query 202 may include both criteria used for data selection and an explicit specification of result fields to be returned based on the data selection criteria. An example of the selection criteria and the result field specification of the abstract query 202 are shown in FIG. 3. Accordingly, the abstract query 202 illustratively includes selection criteria 304 and a result field specification 306.

The resulting query 202 is generally referred to herein as an "abstract query" because the query is composed according to abstract (i.e., logical) fields rather than by direct reference to the underlying data structures in the database 130. As a result, abstract queries may be defined that are independent of the particular underlying physical data representation used. For execution, the abstract query is transformed into a concrete query consistent with the underlying physical representation of the data using the data abstraction model 160. The concrete query is executable against the database 130. An exemplary method for transforming the abstract query into a concrete query is described below with reference to FIGS. 4-5.

In general, the data abstraction model 160 exposes information as a set of logical fields that may be used within an abstract query to specify criteria for data selection and specify the form of result data returned from a query operation. The logical fields are defined independently of the underlying physical representation being used in the database 130, thereby allowing abstract queries to be formed that are loosely coupled to the underlying physical representation.

An Exemplary Data Abstraction Model

Referring now to FIG. 3, a relational view illustrating interaction of the abstract query 202 and the data abstraction model 160 is shown. In one embodiment, the data abstraction model 160 comprises a plurality of field specifications $308_1$, $308_2$, $308_3$, $308_4$ and $308_5$ (five shown by way of example), collectively referred to as the field specifications 308. Specifically, a field specification is provided for each logical field available for composition of an abstract query. Each field specification may contain one or more attributes. Illustratively, the field specifications 308 include a logical field name attribute $320_1$, $320_2$, $320_3$, $320_4$, $320_5$ (collectively, field name 320) and an associated access method attribute $322_1$, $322_2$, $322_3$, $322_4$, $322_5$ (collectively, access methods 322). Each attribute may have a value. For example, logical field name attribute $320_1$ has the value "FirstName" and access method attribute $322_1$ has the value "Simple." Furthermore, each attribute may include one or more associated abstract properties. Each abstract property describes a characteristic of a data structure and has an associated value. As indicated above, a data structure refers to a part of the underlying physical representation that is defined by one or more physical entities of the data corresponding to the logical field. In particular, an abstract property may represent data location metadata abstractly describing a location of a physical data entity corresponding to the data structure, like a name of a database table or a name of a column in a database table. Illustratively, the access method attribute $322_1$ includes data location metadata "Table" and "Column." Furthermore, data location metadata "Table" has the value "contact" and data location metadata "Column" has the value "f_name." Accordingly, assuming an underlying relational database schema in the present example, the values of data location metadata "Table" and "Column" point to a table "contact" having a column "f_name."

In one embodiment, groups (i.e., two or more) of logical fields may be part of categories. Accordingly, the data abstraction model 160 includes a plurality of category specifications $310_1$ and $310_2$ (two shown by way of example), collectively referred to as the category specifications. In one embodiment, a category specification is provided for each logical grouping of two or more logical fields. For example, logical fields $308_{1-3}$ and $308_{4-5}$ are part of the category specifications $310_1$ and $310_2$, respectively. A category specification is also referred to herein simply as a "category". The categories are distinguished according to a category name, e.g., category names $330_1$ and $330_2$ (collectively, category name(s) 330). In the present illustration, the logical fields $308_{1-3}$ are part of the "Name and Address" category and logical fields $308_{4-5}$ are part of the "Birth and Age" category.

The access methods 322 generally associate the logical field names with data in the database (e.g., database 130 of FIG. 1B). Any number of access methods is contemplated depending upon the number of different types of logical fields to be supported.

In one embodiment, access methods for simple fields, filtered fields and composed fields are provided. The field specifications $308_1$, $308_2$ and $308_5$ exemplify simple field access methods $322_1$, $322_2$, and $322_5$, respectively. Simple fields are mapped directly to a particular data structure in the underlying physical representation (e.g., a field mapped to a given database table and column). By way of illustration, as described above, the simple field access method $322_1$ maps the logical field name $320_1$ ("FirstName") to a column named "f_name" in a table named "contact." The field specification $308_3$ exemplifies a filtered field access method $322_3$. Filtered fields identify an associated data structure and provide filters used to define a particular subset of items within the physical representation. An example is provided in FIG. 3 in which the filtered field access method $322_3$ maps the logical field name $320_3$ ("AnyTownLastName") to data in a column named "l_name" in a table named "contact" and defines a filter for individuals in the city of "Anytown." Another example of a filtered field is a New York ZIP code field that maps to the physical representation of ZIP codes and restricts the data only to those ZIP codes defined for the state of New York. The field specification $308_4$ exemplifies a composed field access method $322_4$. Composed access methods compute a logical field from one or more data structures using an expression supplied as part of the access method definition. In this way, information which does not exist in the underlying physical data representation may be computed. In the example illustrated in FIG. 3 the composed field access method $322_4$ maps the logical field name $320_4$ "AgeInDecades" to "AgeInYears/10." Another example is a sales tax field that is composed by multiplying a sales price field by a sales tax rate.

It is contemplated that the formats for any given data type (e.g., dates, decimal numbers, etc.) of the underlying data may vary. Accordingly, in one embodiment, the field specifications 308 include a type attribute which reflects the format of the underlying data. However, in another embodiment, the data format of the field specifications 308 is different from the associated underlying physical data, in which case a conversion of the underlying physical data into the format of the logical field is required.

By way of example, the field specifications 308 of the data abstraction model 160 shown in FIG. 3 are representative of logical fields mapped to data represented in the relational data representation $214_2$ shown in FIG. 2. However, other instances of the data abstraction model 160 map logical fields to other physical representations, such as XML.

An illustrative abstract query corresponding to the abstract query 202 shown in FIG. 3 is shown in Table I below. By way of illustration, the illustrative abstract query is defined using XML. However, any other language may be used to advantage.

TABLE I

ABSTRACT QUERY EXAMPLE

```
001    <?xml version="1.0"?>
002    <!--Query string representation: (AgeInYears > "55"-->
003    <QueryAbstraction>
004      <Selection>
005        <Condition internalID="4">
006          <Condition field="AgeInYears" operator="GT" value="55"
007             internalID="1"/>
```

TABLE I-continued

ABSTRACT QUERY EXAMPLE

```
008        </Selection>
009      <Results>
010        <Field name="FirstName"/>
011        <Field name="AnyTownLastName"/>
012      </Results>
013    </QueryAbstraction>
```

Illustratively, the abstract query shown in Table I includes a selection specification (lines 004-008) containing selection criteria and a result specification (lines 009-012). In one embodiment, a selection criterion consists of a field name (for a logical field), a comparison operator (=, >, <, etc.) and a value expression (what the field is being compared to). In one embodiment, result specification is a list of abstract fields that are to be returned as a result of query execution. A result specification in the abstract query may consist of a field name and sort criteria.

An illustrative data abstraction model ("DAM") corresponding to the data abstraction model 160 shown in FIG. 3 is shown in Table II below. By way of illustration, the illustrative data abstraction model is defined using XML. However, any other language may be used to advantage.

TABLE II

DATA ABSTRACTION MODEL EXAMPLE

```
001    <?xml version="1.0"?>
002    <DataAbstraction>
003      <Category name="Name and Address">
004        <Field queryable="Yes" name="FirstName"
              displayable="Yes">
005          <AccessMethod>
006            <Simple columnName="f_name"
                  tableName="contact"></Simple>
007          </AccessMethod>
008        </Field>
009        <Field queryable="Yes" name="LastName"
              displayable="Yes">
010          <AccessMethod>
011            <Simple columnName="l_name"
                  tableName="contact"></Simple>
012          </AccessMethod>
013        </Field>
014        <Field queryable="Yes" name="AnyTownLastName"
              displayable="Yes">
015          <AccessMethod>
016            <Filter columnName="l_name"
                  tableName="contact">
017              </Filter="contact.city=Anytown">
018          </AccessMethod>
019        </Field>
020      </Category>
021      <Category name="Birth and Age">
022        <Field queryable="Yes" name="AgeInDecades"
              displayable="Yes">
023          <AccessMethod>
024            <Composed columnName="age"
                  tableName="contact">
025            </Composed Expression="columnName/10">
026          </AccessMethod>
027        </Field>
028        <Field queryable="Yes" name="AgeInYears"
              displayable="Yes">
029          <AccessMethod>
030            <Simple columnName="age"
                  tableName="contact"></Simple>
031          </AccessMethod>
032        </Field>
033      </Category>
034    </DataAbstraction>
```

By way of example, note that lines 004-008 correspond to the first field specification $308_1$ of the DAM 160 shown in FIG. 3 and lines 009-013 correspond to the second field specification $308_2$.

Transforming an Abstract Query into a Concrete Query

Figure 4:
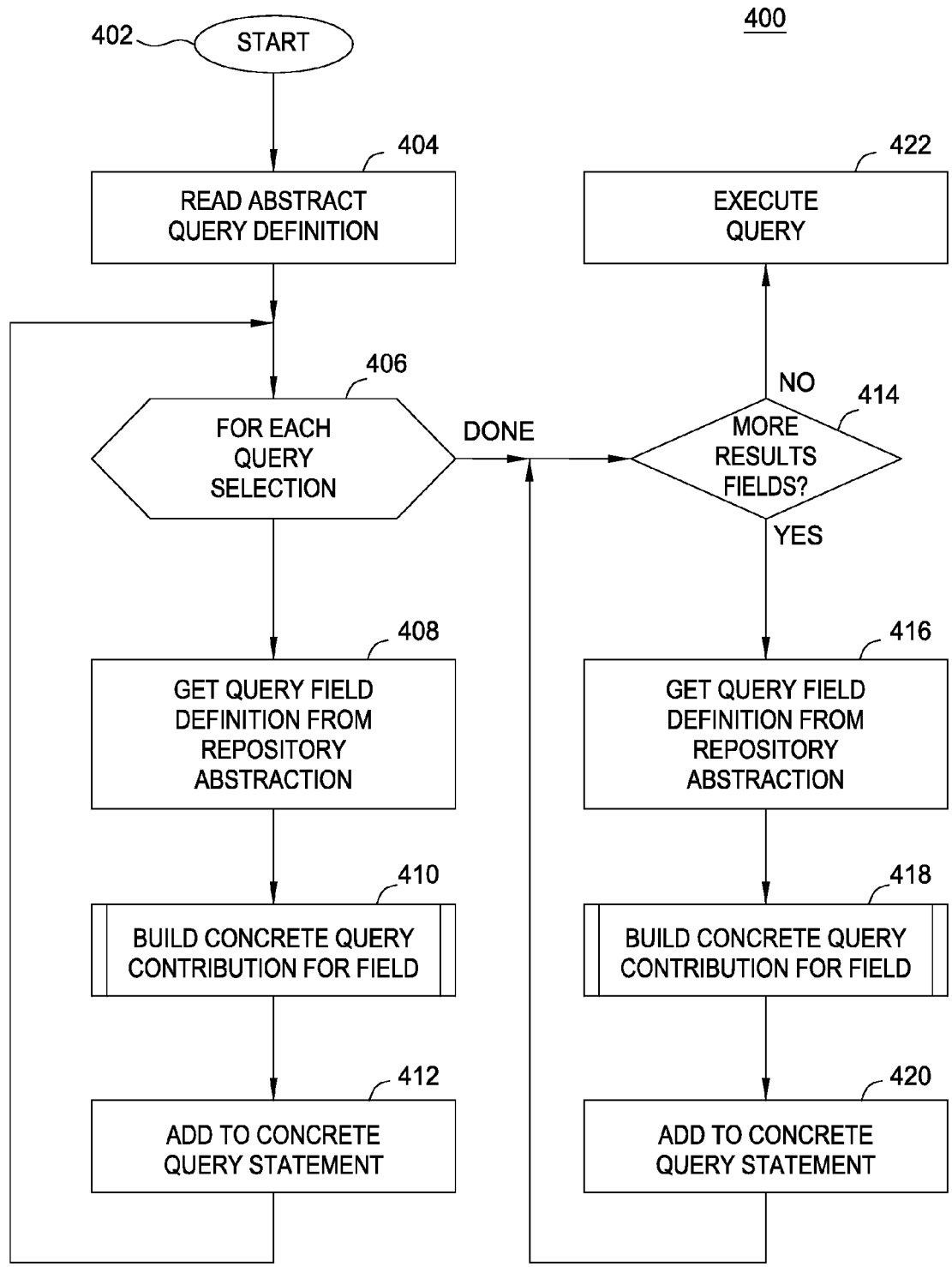
FIGS. 4-5 are flow charts illustrating the operation of a runtime component, according to embodiments of the present invention.

Referring now to FIG. 4, an illustrative runtime method 400 exemplifying one embodiment of the operation of the runtime component 164 of FIG. 1B is shown. The method 400 is entered at step 402 when the runtime component 164 receives as input an abstract query (such as the abstract query shown in Table I). At step 404, the runtime component 164 reads and parses the abstract query and locates individual selection criteria and desired result fields. At step 406, the runtime component 164 enters a loop (comprising steps 406, 408, 410 and 412) for processing each query selection criteria statement present in the abstract query, thereby building a data selection portion of a concrete query. In one embodiment, a selection criterion consists of a field name (for a logical field), a comparison operator (=, >, <, etc.) and a value expression (what is field is being compared to). At step 408, the runtime component 164 uses the field name from a selection criterion of the abstract query to look up the definition of the field in the data abstraction model 160. As noted above, the field definition includes a definition of the access method used to access the data structure associated with the field. The runtime component 164 then builds (step 410) a concrete query contribution for the logical field being processed. As defined herein, a concrete query contribution is a portion of a concrete query that is used to perform data selection based on the current logical field. A concrete query is a query represented in languages like SQL and XML Query and is consistent with the data of a given physical data repository (e.g., a relational database or XML repository). Accordingly, the concrete query is used to locate and retrieve data from the physical data repository, represented by the database 130 shown in FIG. 1B. The concrete query contribution generated for the current field is then added to a concrete query statement. The method 400 then returns to step 406 to begin processing for the next field of the abstract query. Accordingly, the process entered at step 406 is iterated for each data selection field in the abstract query, thereby contributing additional content to the eventual query to be performed.

After building the data selection portion of the concrete query, the runtime component 164 identifies the information to be returned as a result of query execution. As described above, in one embodiment, the abstract query defines a list of result fields, i.e., a list of logical fields that are to be returned as a result of query execution, referred to herein as a result specification. A result specification in the abstract query may consist of a field name and sort criteria. Accordingly, the method 400 enters a loop at step 414 (defined by steps 414, 416, 418 and 420) to add result field definitions to the concrete query being generated. At step 416, the runtime component 164 looks up a result field name (from the result specification of the abstract query) in the data abstraction model 160 and then retrieves a result field definition from the data abstraction model 160 to identify the physical location of data to be returned for the current logical result field. The runtime component 164 then builds (at step 418) a concrete query contribution (of the concrete query that identifies physical location of data to be returned) for the logical result field. At step 420, the concrete query contribution is then added to the concrete query statement. Once each of the result specifications in the abstract query has been processed, the concrete query is executed at step 422.

Figure 5:
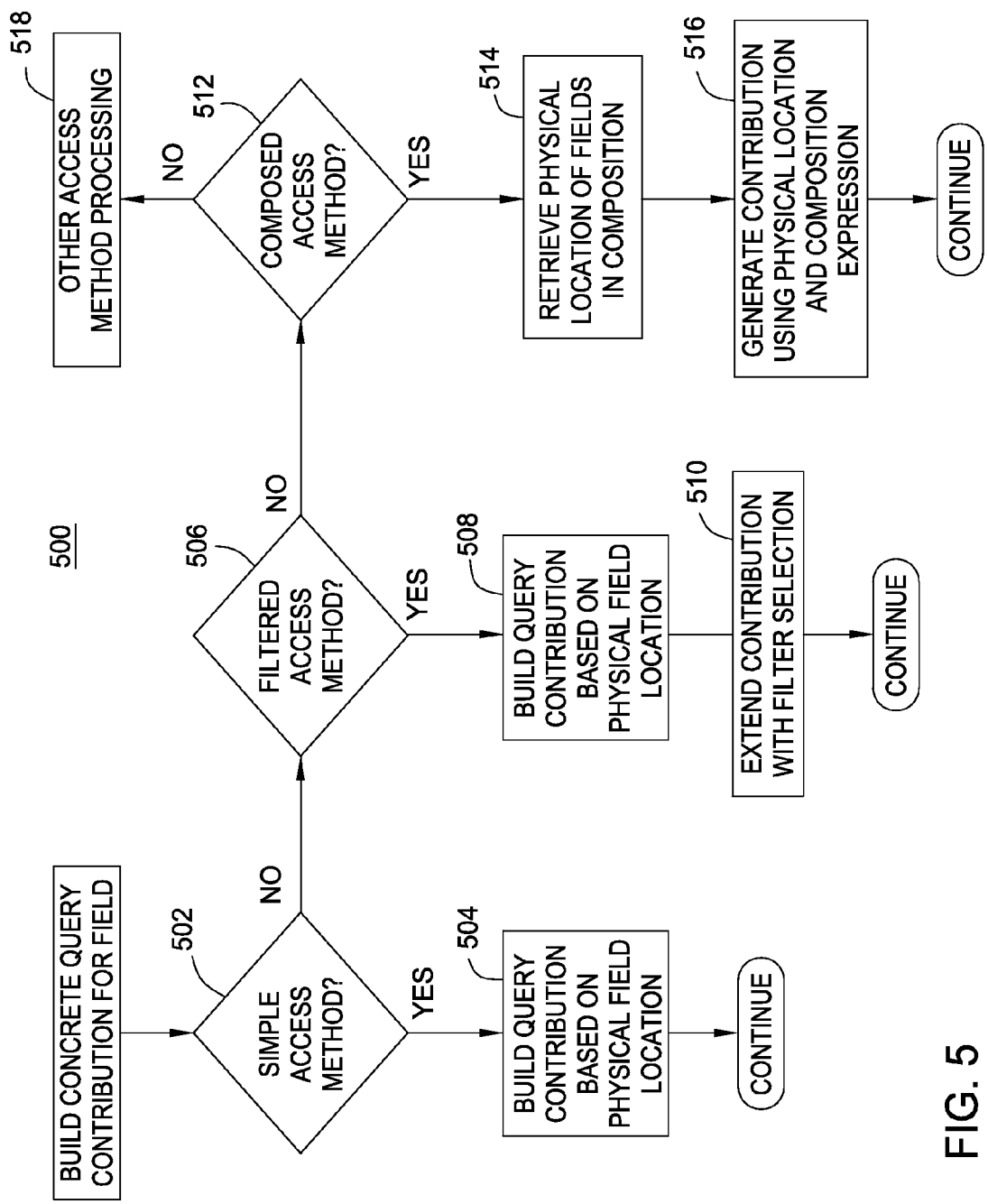

One embodiment of a method 500 for building a concrete query contribution for a logical field according to steps 410 and 418 is described with reference to FIG. 5. At step 502, the method 500 queries whether the access method associated with the current logical field is a simple access method. If so, the concrete query contribution is built (step 504) based on physical data location information and processing then continues according to method 400 described above. Otherwise, processing continues to step 506 to query whether the access method associated with the current logical field is a filtered access method. If so, the concrete query contribution is built (step 508) based on physical data location information for a given data structure(s). At step 510, the concrete query contribution is extended with additional logic (filter selection) used to subset data associated with the given data structure(s). Processing then continues according to method 400 described above.

If the access method is not a filtered access method, processing proceeds from step 506 to step 512 where the method 500 queries whether the access method is a composed access method. If the access method is a composed access method, the physical data location for each sub-field reference in the composed field expression is located and retrieved at step 514. At step 516, the physical field location information of the composed field expression is substituted for the logical field references of the composed field expression, whereby the concrete query contribution is generated. Processing then continues according to method 400 described above.

If the access method is not a composed access method, processing proceeds from step 512 to step 518. Step 518 is representative of any other access method types contemplated as embodiments of the present invention. However, it should be understood that embodiments are contemplated in which less than all the available access methods are implemented. For example, in a particular embodiment only simple access methods are used. In another embodiment, only simple access methods and filtered access methods are used.

Rapid Virtual Database Application Deployment

Figure 6:
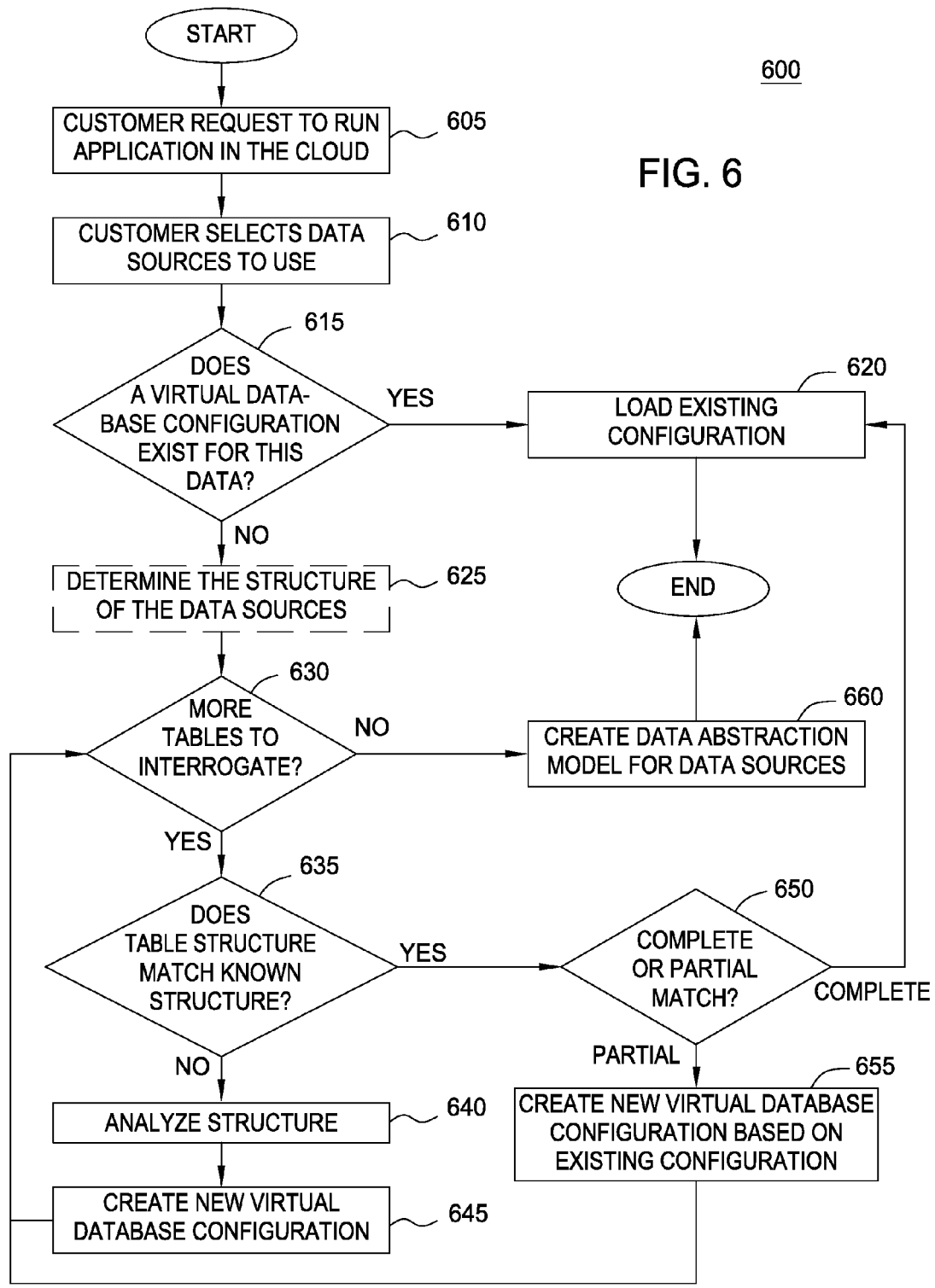
FIG. 6 is a flow diagram illustrating a method for creating an abstraction model, according to one embodiment of the present invention.

FIG. 6 is a flow diagram illustrating a method for creating an abstraction model, according to one embodiment of the present invention. As shown, the method 600 begins at step 605, wherein a customer requests to run an application having one or more data sources in a cloud computing environment. The customer further specifies one or more data sources to deploy in the cloud (step 610). For instance, the customer may select one or more databases to be deployed into the cloud. For purposes of this example, assume that at least one of these selected databases is to be used in conjunction with a logical data layer where abstract queries may be issued against the database (as described above), but that no data abstraction model (e.g., data abstraction model component 162) has yet been created for the database.

Once the customer selects the data sources to deploy into the cloud, the database analysis component 135 receives this information from the customer and determines whether a virtual database configuration already exists for any of the specified data sources (step 615). If the database analysis component 135 determines the configuration information already exists, the database analysis component 135 loads the existing configuration (step 620) and the method 600 ends. This loading process may include, for instance, creating a new data abstraction model for the specified data sources, based on the existing configuration information. For instance, if the database analysis component 135 has previously created a data abstraction model for the selected database, the database analysis component 135 may load the previously created data abstraction model for the selected database. This may be the case when, for instance, the customer is deploying the same database multiple times into the cloud (e.g., for redundancy or load balancing purposes).

If the database analysis component 135 determines that no known configuration information exists, the method 600 enters a loop where the database analysis component 135 determines the structure of the specified data sources (step 625). At step 630, the database analysis component 135 determines whether there are tables remaining in the data sources to interrogate, and if so, the database analysis component 135 determines whether the structure of the next table to interrogate matches a known table structure (step 635). The known table structures may be provided based on previous databases and abstract data models created and/or used by the customer. In one embodiment where the database analysis component 135 is deployed in a cloud computing environment, the database analysis component 135 may analyze other databases (which may be owned and/or operated by other customers) in the cloud in order to identify known table structures. In a particular embodiment, the database analysis component 135 may be configured to analyze these other databases anonymously, so as not to intrude upon any confidential data contained in these databases. For instance, the database analysis component 135 may be configured to analyze the structure of the other database (e.g., determining that a particular table contains two columns having VARCHAR and BOOLEAN values, respectively), without looking at the actual data values contained in the other database (e.g., the VARCHAR and BOOLEAN data values contained in the table).

In yet another embodiment, the database analysis component 135 may be configured to analyze a particular group of other databases. For instance, the customer may manually identify one or more other databases which the database analysis component 135 could analyze in creating the data abstraction model for the selected database. Such a grouping may be identified explicitly. In one embodiment, the grouping may be determined based on a particular class specified for the selected database. Of course, the above examples are without limitation and are provided for illustrative purposes only. Moreover, one of ordinary skill in the art will recognize that any number of data sources and data configurations may be analyzed in accordance with embodiments of the present invention.

If the database analysis component 135 determines the table structure does not match any known table structures, the database analysis component 135 analyzes the structure of the table (step 640). The database analysis component 135 then creates a new virtual database configuration for the table, based on the structure analysis for the table (step 645). Here, the database analysis component 135 may create the portion of the data abstraction model corresponding to the table of the data source, but may set particular fields in the data abstraction model as unmatched. In one embodiment, this is done by setting a flag associated with the fields in the data abstraction model. In other embodiments, the database analysis component 135 may leave the fields blank or set the field to a default value (e.g., "unmatched") to indicate that no match was found. Doing so enables the customer to identify and manually enter values for these fields at some later point in time. Once the new configuration is created, the method returns to step 630, where the database analysis component 135 determines whether there are additional tables to interrogate.

If at step 635 the database analysis component 135 determines that the table structure matches a known table structure, the database analysis component 135 then further determines whether it is a complete match or a partial match. In the event the database analysis component 135 determines the table completely matches a known structure, the database analysis component 135 then loads the existing configuration information for the known structure (step 620) and the method 600 ends. For instance, although the selected database in its entirety may not match any known configurations, the structure of particular tables within the database may match known table structures. In such a case, the database analysis component 135 may use the configuration for the known table structures in creating the abstraction model for the tables in the selected database.

For instance, if the table in the selected database conforms to an industry standard for database tables, and if the database analysis component 135 has previously created and/or processed previous data abstraction models for other tables related to this industry standard, then the database analysis component 135 could generate a new data abstraction model for the selected database using the structure and corresponding mappings of the previous data abstraction models. As an example, a previously-processed database could have a table "T_DATA" for storing test data, which contains a column "code" for storing diagnosis codes, and that the previously-processed database is associated with a previous data abstraction model containing a logical field named "Diagnosis Code" that maps to table "T_DATA" and column "code". For the purposes of this example, further assume that the database selected by the customer contains a table "TestData" for storing test data, and this table contains a column "diagCode" for storing the diagnosis codes.

Here, the database analysis component 135 may analyze the selected database and determine that the table "TestData" and column "diagCode" from the selected database correspond to the table "T_DATA" and column "code" in the previously-processed database. Based on this, the database analysis component 135 may then create a logical field named "Diagnosis Code" in the data abstraction model for the selected database, and map this field to the corresponding table and column in the selected database (i.e., the table "TestData" and column "diagCode"). The database analysis component 135 may also incorporate other information into the logical field, based on the corresponding logical fields in the previous data model. For instance, the access method associated with the new logical field may be created based on the access method for the corresponding logical field in the previous data model. As an example, if the corresponding logical field specifies a filtered access method and a filter expression, the new logical field may be defined to have a filtered access method with the same filter expression. Of note, though, the database analysis component 135 may still update values in filter expression to match the physical fields in the selected database to which the new logical field is mapped. For instance, if the filter expression from the previous data abstraction model specified the expression "T_DATA.code=ABC", the database analysis component 135 may update the filter expression to "TestData.diagCode=ABC", so as to reflect the structure of the selected database.

If the database analysis component 135 instead determines the table structure only partially matches the known table structure, then the database analysis component 135 creates a new virtual database configuration based, at least in part, on the existing configuration information (step 655). That is, while the entire structure of a particular database table may not be known, particular columns within the table may match known configuration information. In such a case, the database analysis component 135 may create the new virtual database configuration for the known portions of the table. If, after doing this, other portions of the table are still unknown, the database analysis component 135 may then flag these portions as unmatched, so that the customer may later manually enter the information for these portions. The method 600 then returns to step 630, where the database analysis component 135 determines whether there are more tables in the data sources to interrogate.

Once all the tables have been analyzed, the database analysis component 135 then creates a data abstraction model for the data sources (step 660). Once the data abstraction model is created, the method 600 ends. Advantageously, the method 600 enables data abstraction models to be efficiently created for new data sources. As manually creating a data abstraction model for a database can be expensive in terms of both time and resources, the savings gained from use of the method 600 may be substantial. These cost savings may be particularly substantial in a cloud computing environment, where the database analysis component 135 may analyze other databases and data abstraction models deployed in the cloud to identify similarities to the selected database. As an additional advantage, the method 600 may even perform this analysis anonymously, thus protecting any confidential information contained in the other databases and abstraction models in the cloud.

Figure 7:
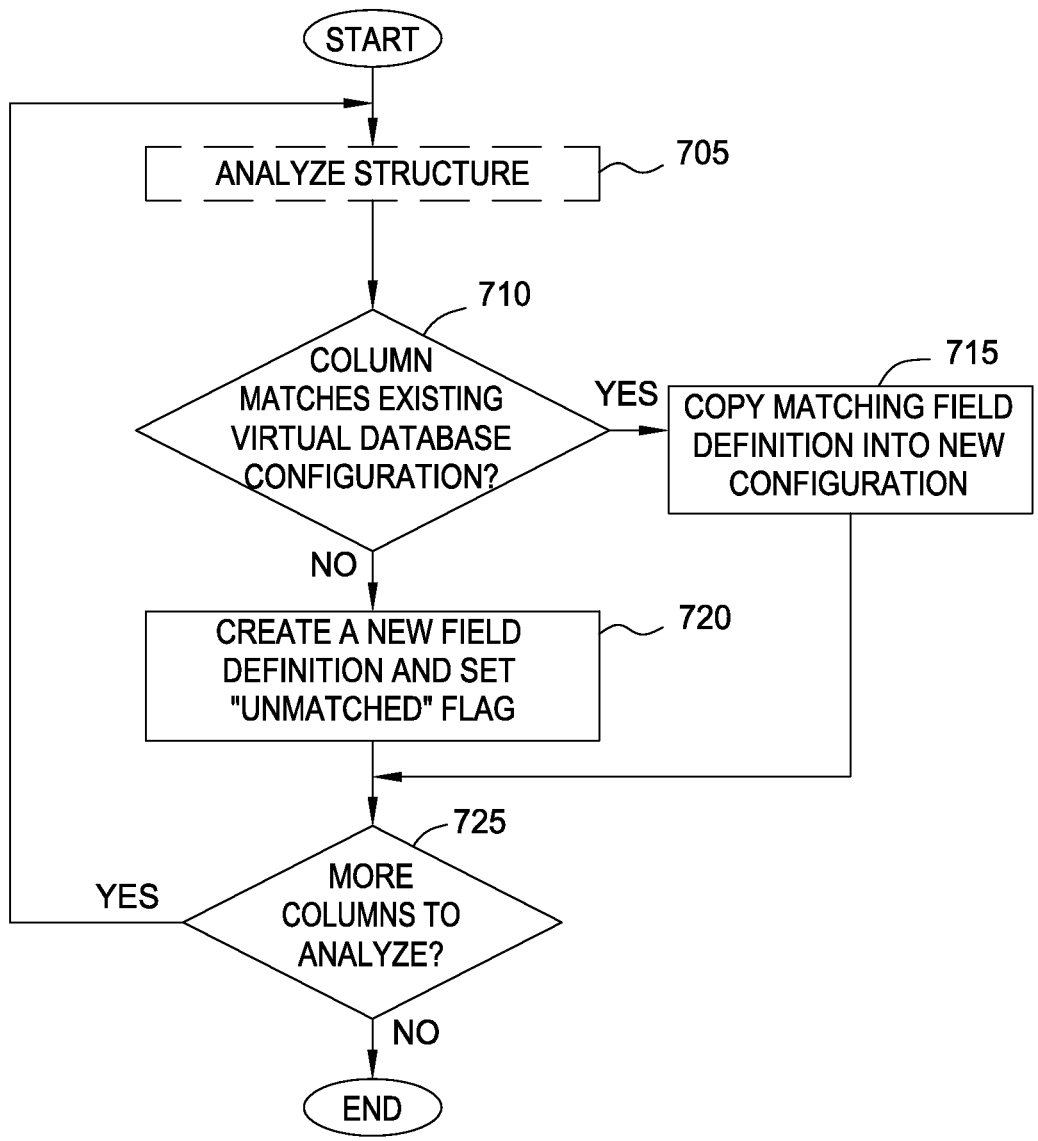
FIG. 7 is a flow diagram illustrating a method for analyzing a database, according to one embodiment of the present invention.

FIG. 7 is a flow diagram illustrating a method for analyzing a database, according to one embodiment of the present invention. As shown, the method 700 begins at step 705, where the database analysis component 135 analyzes the structure of a table in a data source. The method 700 then continues where, for the first column of the table, the database analysis component 135 determines whether the column matches existing virtual database configuration information (step 710). As discussed above, this determination may be made based upon, without limitation, the data type of the column, the data contained within the column, conformance of the data with any known standards, and so on.

If the database analysis component 135 determines that the column does match, the database analysis component 135 copies a matching field definition from the existing virtual database configuration information into the new configuration (step 715). For instance, upon determining the column matches a known column configuration, the database analysis component 135 may copy a portion of a data abstraction model associated with the known column configuration into a new data abstraction model for the data source being analyzed. In addition, the database analysis component 135 may update the copied portion of the data model to reflect the physical database structure of the database being analyzed.

If the database analysis component 135 determines that the column does not match any known configurations, the database analysis component 135 creates a new field definition for the column and identifies the new field definition as "unmatched" (step 720). Although a flag is used in the depicted example to designate the column as unmatched, such an example is for illustrative purposes only, and it is explicitly contemplated that other methods could be used to designate the columns as unmatched. For example, in one embodiment, the database analysis component 135 sets the new field definition to a default value to indicate that no match was found. In an alternate embodiment, the database analysis component 135 creates the new field definition but does not set it to any value at all, so as to indicate that no match was found. Moreover, one of ordinary skill in the art will recognize that any number of other methods could be used to designate the new field definition as unmatched.

Once the database analysis component 135 creates the new field definition, whether populated with the matching field definition information or flagged as unmatched, the database analysis component 135 determines whether there are more columns in the table to analyze (step 725). If so, the method 700 returns to step 705, where the database analysis component 135 analyzes the structure of the next column in the table. If the database analysis component 135 determines that there are no more columns to analyze, the method 700 ends. Advantageously, the method 700 enables a data abstraction model to be created for new data sources by identifying similar existing data models and populating portions of the new data abstraction model with corresponding portions from the similar data models. Doing so allows a logical data representation to be quickly and easily created for new data sources, thus saving the substantial cost in terms of time and resources required to manually create such a logical data representation.

Figure 8:
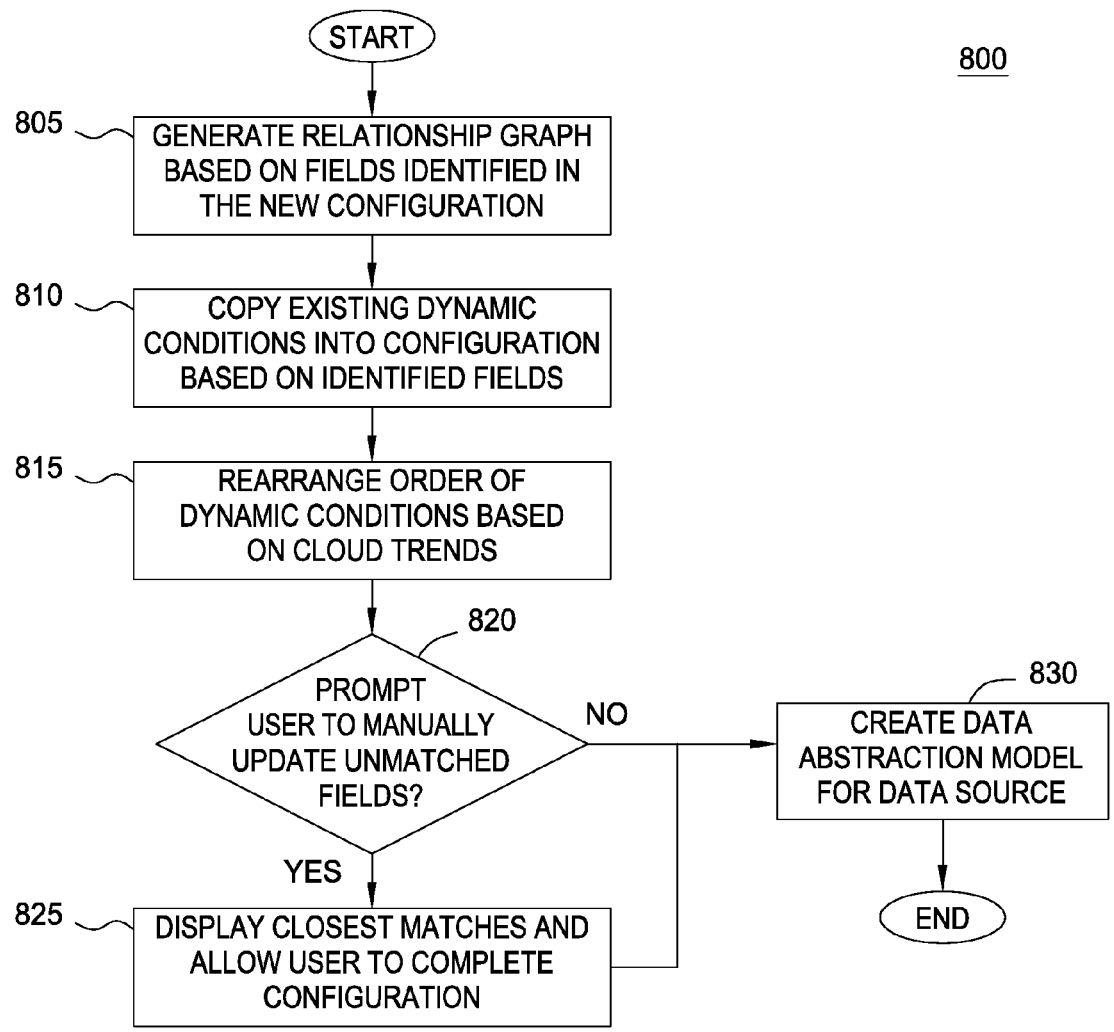
FIG. 8 is a flow diagram illustrating a method for creating an abstraction model, according to one embodiment of the present invention.

FIG. 8 is a flow diagram illustrating a method for creating an abstraction model, according to one embodiment of the present invention. As shown, the method 800 begins at step 805, where the database analysis component 135 generates a relationship graph based on fields identified in the new data abstraction model configuration. That is, relationships in the cloud are analyzed to identify existing joins between tables/fields. In addition, attribute relationships may be analyzed. For example, assume field A and field B are identified, and field A has been defined as an attribute of field B 80% of the time. If the database analysis component 135 determines that this percentage exceeds a defined threshold amount, then the database analysis component 135 may automatically set field A as an attribute of field B for the new data source.

The database analysis component 135 then copies existing dynamic conditions into the new configuration, based on the identified fields (step 810). The dynamic conditions are part of the overall configuration of a virtual database application, similar to the data abstraction model. Generally speaking, dynamic conditions allow a condition building UI for a database application to be customized. As an example, a dynamic condition may be used to display an advanced multi-field form to the user, allowing the user to create a single conditional statement which involves multiple fields of the form. As a second example, a dynamic condition could be used as part of an interface where users can select a state or country from a map instead of a dropdown list. In such an example, the dynamic condition may be easier or more intuitive for the developer to construct than a traditional conditional statement.

Additionally, these dynamic conditions may be related to fields or data types of fields in a data abstraction model. Continuing the example given above of an interface where users can select a state from a map, the dynamic condition may be associated with a state field in a data abstraction model. Similarly, a dynamic condition associated with a calendar could be associated with a date field of a data abstraction model. Accordingly, in addition to creating the new data abstraction model containing logical fields based on the relationship graph, the database analysis component 135 may be further configured to populate the new data abstraction model with dynamic conditions from an existing data abstraction model.

Once the existing dynamic conditions are copied, the database analysis component 135 rearranges the order of the dynamic conditions based on identified cloud trends (step 815). Generally speaking, the dynamic conditions are arranged in a particular order, in which the dynamic conditions are processed. Accordingly, in addition to determining which dynamic conditions should be included in the data abstraction model based on the relationship graph, the database analysis component 135 further determines an ordering for the dynamic conditions based on the relationship graph specifying trends amongst other data abstraction models in the cloud.

The database analysis component 135 then determines whether the user should be prompted to manually update any unmatched fields (step 820). Such a determination may be based on, for instance, whether any unmatched fields have been identified (e.g., at step 720). If the database analysis component 135 determines the user should be prompted, then the database analysis component 135 outputs the closest matches from the known configurations for display to the user. The user may then select one of the displayed matches to be used for the field in the data abstraction model. Alternatively, the user may manually enter information to be used for the field in the data abstraction model. This may be preferable, for instance, when the new data source does not conform to the structure and standards of the existing configurations, and thus none of the displayed matches is accurate for the new data source. Once the user has manually updated the unmatched fields, or alternatively if the database analysis component 135 determines that there are no unmatched fields to update, the database analysis component 135 creates the data abstraction model for the new data source (step 830), and the method 800 ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for creating a first data abstraction model for a first database, comprising:
    analyzing the first database to determine a first set of structural characteristics for contents of the first database;
    analyzing a second database, distinct from the first database, to determine a second set of structural characteristics for contents of the second database, wherein a second data abstraction model is available for the second database that defines a plurality of logical fields that each map to at least one database field in the second database, and wherein each of the logical fields specifies at least (i) a logical field name and (ii) an access method selected from a plurality of distinct access methods, wherein the access method defines a technique for generating output based on the at least one database field the logical field maps to;
    comparing the first set of structural characteristics with the second set of structural characteristics to determine comparable structural characteristics of the first and second databases, relevant to the second data abstraction model of the second database; and
    creating the first data abstraction model for the first database, based on the contents of the first and second databases, the determined comparable structural characteristics of the first and second databases and the second data abstraction model for the second database.

2. The method of claim 1, wherein comparing the first set of structural characteristics with the second set of structural characteristics, further comprises:
    comparing the first set of structural characteristics with a set of standardized data to determine whether at least a portion of the first database adheres to standards defined for the set of standardized data;
    comparing the second set of structural characteristics with the set of standardized data to determine whether at least a portion of the second database adheres to the standards defined for the set of standardized data; and
    upon determining both the first set of structural characteristics and the second set of structural characteristics adhere to the standards, identifying a similarity between the portion of the first database and the portion of the second database.

3. The method of claim 1, wherein the first set of structural characteristics includes an indication of tables contained in the first database.

4. The method of claim 3, wherein the first set of structural characteristics, for at least one of the tables, further includes an indication of columns in the table, a data type of the columns in the table, and a relationship between at least two of the tables.

5. The method of claim 1, wherein analyzing the second database is performed anonymously, wherein the data contained in the second database is not accessed during the analysis.

6. The method of claim 1, wherein creating the first data abstraction model for the first database, further comprises:
    for each of the identified similarities, inserting a corresponding portion of the second data abstraction model into the first data abstraction model; and
    updating the inserted portion to refer to corresponding physical database fields in the first database.

7. The method of claim 1, wherein both the first database and the second database are provided as services in a cloud computing environment.

8. The method of claim 1, wherein the first data abstraction model defines a plurality of logical fields, wherein each of the logical fields maps to at least one database field in the first database, and wherein each of the logical fields specifies at least (i) a logical field name and (ii) an access method, wherein the access method defines an association between the logical field and the corresponding at least one database field to which the logical field is mapped.

* * * * *